US008479188B2

(12) United States Patent
Singh et al.

(10) Patent No.: US 8,479,188 B2
(45) Date of Patent: Jul. 2, 2013

(54) BINARY CODE CHANGE VULNERABILITY PRIORITIZATION

(75) Inventors: Abhishek Singh, Bellevue, WA (US); Tanmay Ganacharya, Kirkland, WA (US); Scott Lambert, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 12/832,203

(22) Filed: Jul. 8, 2010

(65) Prior Publication Data

US 2012/0011493 A1   Jan. 12, 2012

(51) Int. Cl.
*G06F 9/44* (2006.01)
*G06F 9/445* (2006.01)

(52) U.S. Cl.
USPC ............ 717/168; 717/169; 717/170; 717/175

(58) Field of Classification Search
None
See application file for complete search history.

(56) References Cited

U.S. PATENT DOCUMENTS

| 7,073,172 | B2 * | 7/2006 | Chamberlain | 717/169 |
|---|---|---|---|---|
| 7,647,637 | B2 | 1/2010 | Schuba et al. | |
| 7,865,888 | B1 * | 1/2011 | Qureshi et al. | 717/168 |
| 8,365,164 | B1 * | 1/2013 | Morgenstern | 717/175 |
| 2002/0112200 | A1 * | 8/2002 | Hines | 714/38 |
| 2005/0015760 | A1 | 1/2005 | Ivanov et al. | |
| 2005/0198388 | A1 * | 9/2005 | Teodosiu et al. | 709/245 |
| 2007/0083859 | A1 * | 4/2007 | Fussell et al. | 717/168 |
| 2008/0209567 | A1 | 8/2008 | Lockhart et al. | |
| 2011/0173601 | A1 * | 7/2011 | de los Reyes | 717/169 |
| 2012/0144380 | A1 * | 6/2012 | Rabeler et al. | 717/170 |

OTHER PUBLICATIONS

Gupta et al., Models for patch-based image restoration, Jan. 2009, 12 pages, <http://delivery.acm.org/10.1145/1610000/1608910/p4-gupta.pdf>.*
Hu et al., Fast image rearrangement via multi-scale patch copying, Oct. 2010, 4 pages, <http://delivery.acm.org/10.1145/1880000/1874053/p691-hu.pdf>.*
Brumley, David, "Analysis and Defense of Vulnerabilities in Binary Code", retrieved at <<http://reports-archive.adm.cs.cmu.edu/anon/2008/CMU-CS-08-159.pdf, Sep. 29, 2008, pp. 155.
Wang, et al., "IntScope: Automatically Detecting Integer Overflow Vulnerability in X86 Binary", retrieved at <<http://www.isoc.org/isoc/conferences/ndss/09/pdf/17.pdf>>, 2009, pp. 14.
Fisher, Gwyn, "Automated Source Code Analysis", retrieved at <<http://www.nohau.se/images/articles/PDF-Source-Code-Analysis-Whitepaper-6-071.pdf>>, 2007, p. 13.

(Continued)

*Primary Examiner* — Thuy Dao
(74) *Attorney, Agent, or Firm* — Ogilvie Law Firm

(57) ABSTRACT

A human-readable list of patch differences ranked by weight helps vulnerability analysts allocate their time. From binary code, identified source functions and recognized sink functions are used when assigning relative weights to changes caused by a patch. Source functions are identified using an export table, import table, and remote procedure call interface. Sink functions are recognized using blacklisted functions, patch-targeted functions, memory functions, string functions, and functions called with mismatched parameters. A change prioritizer assigns weights based on an architectural graph and a set of prioritization rules that specify what kind of change is made by a patch, and what kind of function is changed. Weight assignments may be additive. Rules may assign certain kinds of change a higher priority for subsequent scrutiny by an analyst.

20 Claims, 3 Drawing Sheets

OTHER PUBLICATIONS

Lam, et al., "Securing Web Applications with Static and Dynamic Information Flow Tracking", retrieved at <<http://suif.stanford.edu/papers/pepm08.pdf>>, Jan. 7-8, 2008, pp. 10.

Livshits, et al., "Finding Security Vulnerabilities in Java Applications", retrieved at <<http://suif.stanford.edu/papers/usenixsec05.pdf>>, Retrieved Date: Jun. 15, 2010, pp. 16.

"Beaengine: Disassembler Library X86 X86-64 (IA32 and Intel64)", retrieved at <<http://www.beaengine.org/>>, Copyright 2009, pp. 4.

"Black Hat ® Technical Security Conference: 2010 // Briefings", retrieved at <<http://www.blackhat.com/html/bh-us-10/bh-us-10-briefings.html>>, Retrieved Date: Jun. 15, 2010, pp. 30.

"DarunGrim: A Patch Analysis and Binary Diffing Tool And More", retrieved at <<http://www.darungrim.org/>>, Retrieved Date: Jun. 15, 2010, pp. 2.

"OpenRCE Hosted Downloads: IDA Plugins", retrieved at <<http://www.openrce.org/downloads/browse/IDA_Plugins>>, Retrieved Date: Jun. 22, 2010, pp. 6.

"Taint checking", retrieved at <<http://en.wikipedia.org/wiki/Taint_checking>>, Retrieved Date: Jun. 16, 2010, pp. 2.

* cited by examiner

BINARY CODE CHANGE VULNERABILITY PRIORITIZATION

BACKGROUND

A patch is a piece of software designed to modify or replace a computer program or its supporting data. Patches may be designed to add features and/or to fix security vulnerabilities and other bugs, for example. Many patches are distributed as binary code, not as source code. Binary patches modify a program executable (the code that runs on a machine), by modifying the program's binary file(s) to include the fixes or by completely replacing the binary file(s). A patch that can be applied to a program while the program is running is called a "hot patch". Large patches are sometimes referred to as "service packs", "software updates", or "software packages".

Some approaches install patches automatically. Automated installation is often used for patching server software and operating systems, for instance. In particular, security patches are often automatically downloaded and applied, in order to remove vulnerabilities that would otherwise be exploitable. Security patches are widely used to fix security vulnerabilities, and may be analyzed by researchers and other people who did not create the patch. Analysis of the changes made by a patch can be helpful in understanding the vulnerabilities addressed by the patch, and in preparing signatures for use by anti-malware software.

SUMMARY

A given patch or set of patches may make many changes to a binary code, for a variety of reasons. Access to the patch source code and access to the developer who wrote the patch are generally not available. As a result, sorting out the impact of patch changes, and assessing the intent and effects of patch changes, can be very labor-intensive even for skilled analysts.

Some embodiments discussed herein provide or assist binary code change vulnerability prioritization to help organize scrutiny of patch changes by analysts. For example, some embodiments first obtain a collection of patch differences representing changes to a precursor binary code, by using the patch and/or patched code, for example. These embodiments automatically identify source functions, automatically recognize sink functions, and then automatically assign weights to respective patch differences that are located between some identified source function and some recognized sink function. Other changes may be assigned a negative (low priority) weight. Some embodiments output a human-readable list of patch differences ranked by weight, to help analysts allocate their time.

In some embodiments, a change prioritizer assigns weights to respective patch differences based on an architectural graph (e.g., control flow graph, data flow graph, program dependency graph) and also on a set of rules which specify particular kinds of patch differences. Source functions may be identified using an export table, import table, and/or remote procedure call interface, for example. Sink functions may be recognized in the form of blacklisted functions, patch-targeted functions, memory functions, string functions, and/or functions called with parameters that do not match their specifications, for example. Rules may specify what kind of change is made (or will be made) by a patch, what will be changed (e.g., what kind of function), or both.

Weight assignment in an embodiment may be additive and/or preemptive (non-additive). Weights may be assigned favorably, that is, by assigning certain kinds of changes higher priority for subsequent scrutiny by an analyst. Some embodiments favor data flow changes for scrutiny in comparison with control flow changes, favor string concatenation or string copy changes over other changes, favor scrutiny of a change which introduces a comparison instruction in a parameter of a memory function, favor scrutiny of changes which add safe function calls, and/or favor scrutiny of a change which replaces a string manipulation assembly routine with a call to a string copy function, for example.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
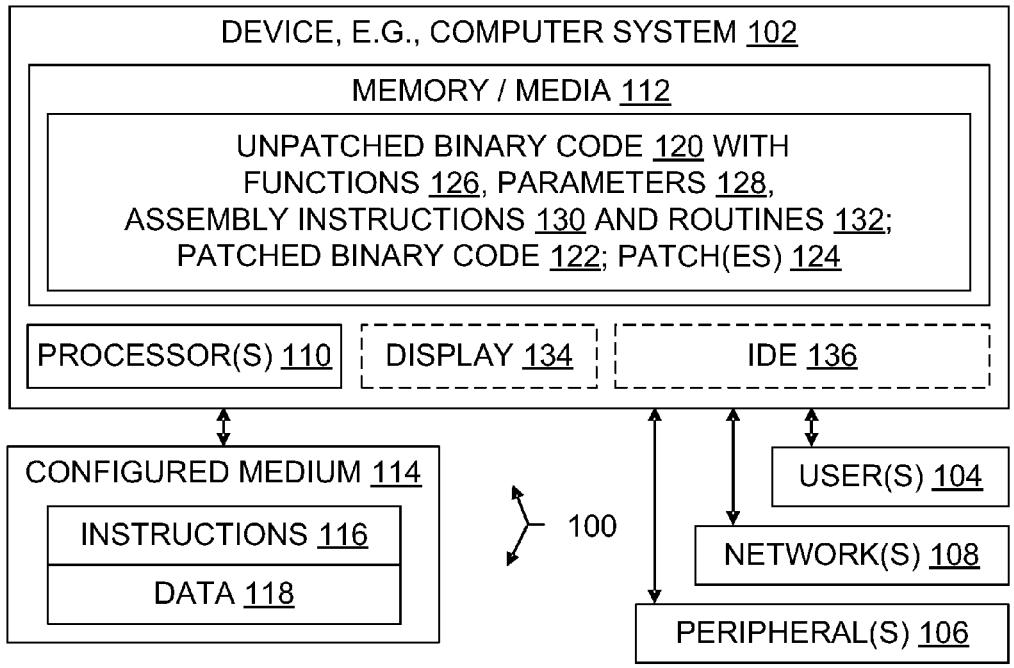
FIG. 1 is a block diagram illustrating a computer system having at least one processor, at least one memory, at least one binary code, at least one installed or not-yet-installed patch, and other items in an operating environment which may be present on multiple network nodes, and also illustrating configured storage medium embodiments.

To enhance or add features, fix vulnerabilities, and make other changes in already issued software, some companies issue binary patches. These patches contain code changes which are introduced into a previously issued binary code. Human analysts sometimes scrutinize patch changes to determine which of the changes address security vulnerabilities, and to learn more about what was (or will be) changed by applying the patch. Such information may be helpful, for instance, in efforts to write signatures designed to help anti-malware tools identify attempts to exploit a vulnerability. Identifying the cause of a vulnerability may thus involve identifying the relevant code changes provided in a patch that attempts to fix the vulnerability.

However, a given patch may make many changes, of several different kinds, such as adding new features or fixing bugs unrelated to security. Not all changes of a given patch are necessarily meant to fix security vulnerabilities. In the particular example of a patch denoted MS04-031 "Remote Elevation of Privilege Vulnerability in NetDDE" from Microsoft® Corporation, a diff comparison of patched and unpatched netdde.exe code revealed over seventy code changes. However, only one of those changes fixed a vulnerability; the other changes were directed differently. An unassisted human analyst would require substantial time to analyze all of the changed functions in this patch, even though in this particular example the overwhelming majority of changes were not relevant to fixing the vulnerability. This example is not necessarily representative with regard to the ratio of vulnerability changes to other changes made; some patches only address vulnerabilities, and some mostly address vulnerabilities. But a lesson of this example remains valid, namely, substantial time may be needed to determine which changes in a given patch are directed at security vulnerabilities.

Some embodiments described herein make use of a data flow graph and a control flow graph to rank the code changes in order of likely relevance to security vulnerabilities. Particular rules may also be applied heuristically to rank changes. Such automatic ranking of code changes helps an analyst identify the code changes which fix (or try to fix) a vulnerability. Code changes which attain highest rank can be analyzed first, to help reduce the time and effort needed for analysis of the patch's intended and actual results.

Some embodiments traverse the binary code to which a patch will be (or has been) applied, and recognize (identify, locate, etc.) functions in that code which are more likely vulnerable to exploitation. These vulnerable functions are called sink functions. After recognition of the sink functions, some embodiments construct a call graph to the sink functions from source functions that take input from the network. If code changes are in the data flow path or control path between source and sink, they are assigned weight. If the code changes contain certain assembly instructions then they are assigned weight. The code changes which are assigned greater maximum weight are ranked higher.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example.

The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "function(s)" means "one or more functions" or equivalently "at least one function".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", "outputting", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, analysts, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by eliciting, identifying, recognizing, prioritizing, constructing, outputting, binding, weight assignment, deployment, execution, modification, display, creation, loading, and/or other operations.

An unpatched binary code 120, patched binary code 122, patch 124, other software, and other items shown in the Figures may reside partially or entirely within one or more media 112, thereby configuring those media. It is generally convenient and followed herein to speak of a given binary code as "patched" or "unpatched" with regard to one or more particular patches 124, rather than speaking of unpatched code in an absolute sense as having never been the target of any patch or and patched code in an absolute sense as having been the target of at least one patch. Thus, an unpatched binary code 120 may have been patched earlier but can still be unpatched with respect to a particular patch 124 of interest. Binary code 120 to which a particular patch 124 has not yet been applied and which is an intended target of that patch is sometimes referred herein as "precursor binary code".

Codes 120, 122 may include function(s) 126 which specify and receive parameter(s) 128. Codes 120, 122 may also include assembly instructions 130, sometimes in the form of assembly routines 132. Assembly routines may also have parameter(s) 128. Binary codes 120, 122, and patches 124, may be stored in the form of machine language, assembly language, or both. Binary codes are executable, either directly or through a virtual machine which has a register set, for example.

The illustrated environment includes a processor 110, memory 112, display 134, and networking hardware. An operating environment may also include other hardware, such as buses, power supplies, and accelerators, for instance.

A given operating environment 100 may include an Integrated Development Environment (IDE) 136 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of anti-malware software development per se that use vulnerability analyses, security patches, or both.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
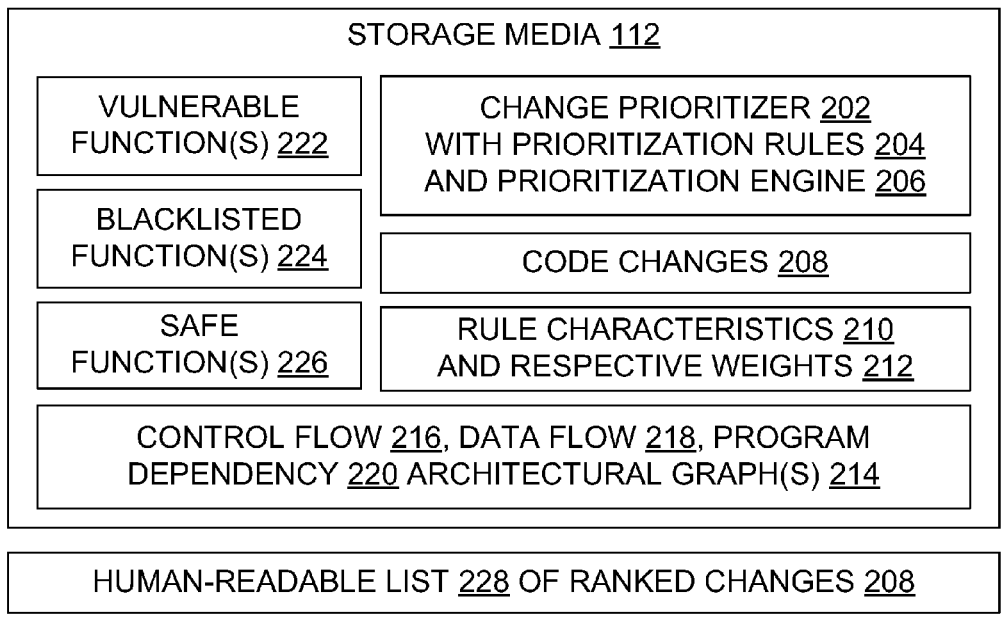
FIG. 2 is a block diagram illustrating binary code patch change prioritization in an example architecture.

FIG. 2 illustrates an architecture which is suitable for use with some embodiments. A change prioritizer 202 uses prioritization rules 204 and a prioritization engine 206 to prioritize code changes 208 which have been (or will be) made by application of a patch 124 to binary code. Each prioritization rule 204 may include rule characteristics 210 such as the kind of change made and the kind of function/routine in which the change is made, for example. Each prioritization rule 204 may have an associated weight 212 which the engine 206 assigns to the code change(s) 208 that satisfy the rule's characteristic(s) 210.

In some embodiments, the engine 206 may limit assignment of weights to changes 208 that lie on particular paths in an architectural graph 214, such as a path in a control flow graph 216, a data flow graph 218, or a program dependency graph 220, for example. Call graphs are an example of control flow graphs. The rules 204 themselves, and/or other aspects of engine 206 assignment of weights 212, may depend on the presence in the code of vulnerable functions 222 such as functions that receive input via a network 108, blacklisted functions 224 such as string manipulation functions, or safe functions 226 such as functions which are known to validate (sanitize) their inputs and hence prevent exploitation, for example.

Some embodiments produce and/or include a human-readable list 228 of ranked changes 208 based on the assigned weights. For instance, the list 228 may be shown on a display 134, printed, written in a natural language in a file, spoken aloud using speech synthesis and a speaker, and/or otherwise presented in a "human-readable" form. The list 228 may be provided to an analyst to assist the analyst in locating patch changes 208 that pertain to security vulnerabilities.

With reference to FIGS. 1 and 2, some embodiments provide a computer system 102 with a logical processor 110 and a memory medium 112 configured by circuitry, firmware, and/or software to prioritize patch changes according to their likely relevance to security vulnerabilities, as described herein. One such computer system includes a memory 112 in operable communication with a logical processor. A precursor binary code 120 resides in (and hence configures) the memory. At least one patch 124 also resides in the memory. The patch(es) contain code changes 208 configured to modify the precursor binary code upon application of the patch to the precursor binary code. A change prioritizer 202 resides at least partially in the memory; it may be partially implemented in software. The change prioritizer has a collection of vulnerability prioritization rules 204 which specify characteristics 210 of code changes 208 and also specify corresponding code change weights 212. The change prioritizer 202 also has a prioritization engine 206 which is configured to apply the vulnerability prioritization rules to the patch code changes and produce a list 228 of code changes ranked by weight under the rules.

The prioritization rules 204 can be grouped for discussion purposes in various ways. One approach focuses on the kind of function involved, e.g., by grouping rules that pertain to string manipulation functions, and separately grouping rules that pertain to memory manipulation functions. Another approach focuses on function calls and parameters, e.g., by grouping rules that pertain to changes in function parameters or their immediate context (e.g., by the addition of comparison instructions targeting parameters), and by separately grouping rules that pertain to safe functions 226. However, a given rule 204 may conceptually lie in more than one group, and grouping of rules is understood to be primarily for convenience of discussion.

For example, in some embodiments, the vulnerability prioritization rules 204 specify at least one of the following as a code change characteristic 210: a code change 208 replaces a vulnerable function 222 call with a safe function 226 call, a code change 208 deletes an assembly routine 132 and adds a safe function 226 call, a code change 208 adds a comparison instruction 130 to a function parameter 128, a code change 208 adds a comparison instruction 130 to an assembly routine parameter 128, a code change 208 provides a different value to an assembly routine parameter 128, a code change 208 provides a different value to a function parameter 128, a code change 208 alters a parameter 128 of vulnerable assembly instructions, a code change 208 prevents a flow (data and/or control) from reaching a vulnerable assembly routine. Different rules may have different weights, or all rules may have the same weight, depending on the embodiment.

Some embodiments include an architectural graph 214 residing (and thus configuring) in the memory. The architectural graph has an identification of at least one source function and also has a recognition of at least one sink function. The vulnerability prioritization rules 204 specify at least one of the following as a code change characteristic 210: a control flow architectural graph 216 connection between an identified source function and a patch-targeted recognized sink function, a data flow architectural graph 218 connection between an identified source function and a patch-targeted recognized sink function, a program dependency architectural graph 220 connection between an identified source function and a patch-targeted recognized sink function.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
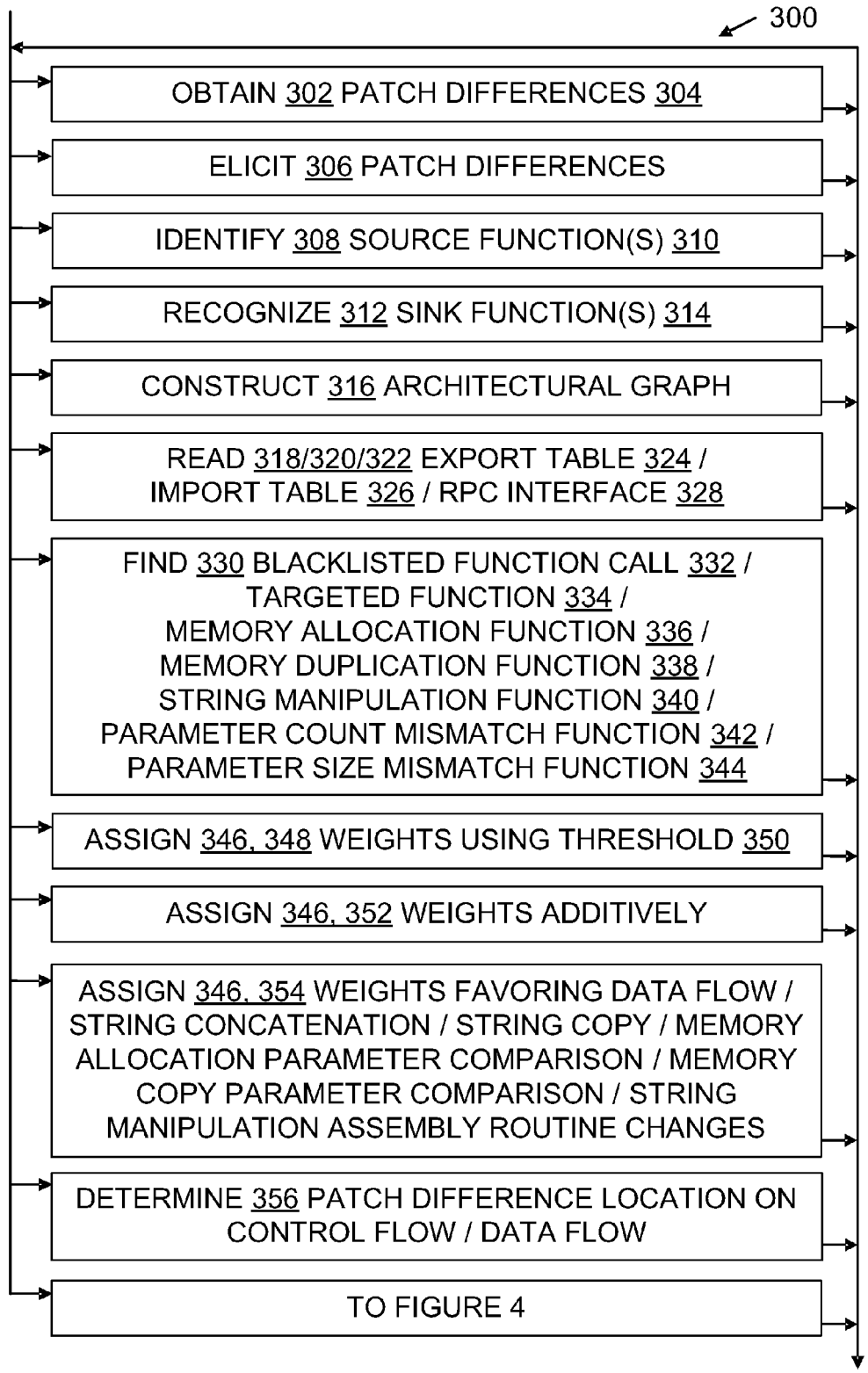
FIGS. 3 and 4 collectively provide a flow chart illustrating steps of some process and configured storage medium embodiments.
Figure 4:
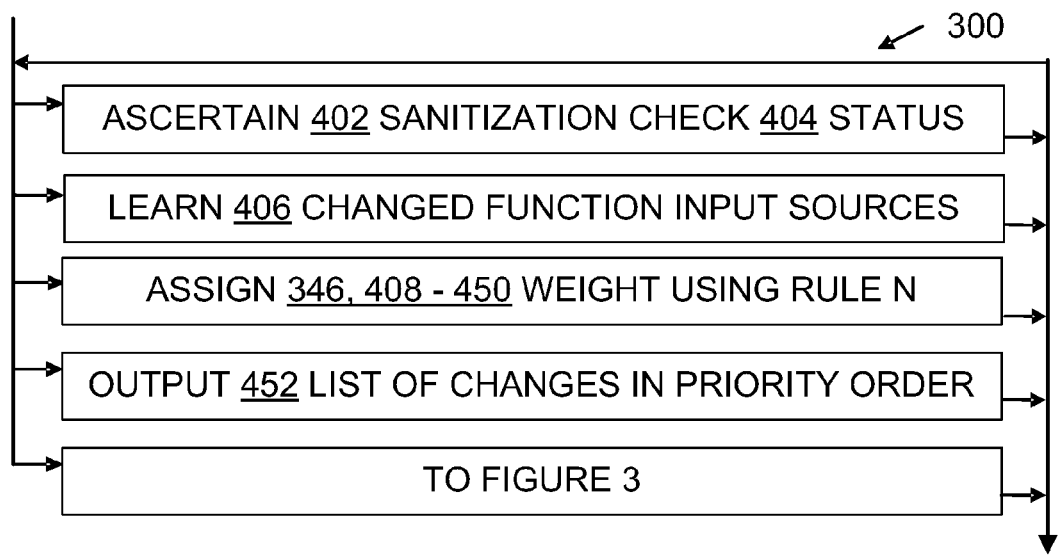

FIGS. 3 and 4 illustrates some process embodiments in a flowchart 300. Processes shown in the Figures may be performed in some embodiments automatically, e.g., by a change prioritizer 202 under control of a script requiring little or no human user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 3 and 4. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a patch difference obtaining step 302, an embodiment obtains patch differences 304, which represent code changes 208. Step 302 may be accomplished by eliciting the differences or by reading a transmission or file of previously elicited differences, for example.

During a patch difference eliciting step 306, an embodiment elicits patch differences 304, as opposed to reading previously elicited differences. Step 306 may be accomplished by differing patched and unpatched codes, by comparing a patch with a target unpatched code, and/or by other mechanisms, for example.

During a source function identifying step 308, an embodiment identifies one or more source functions 310, such as functions 126 capable of receiving textual input over a network or through a user interface or from a file, for instance. Step 308 may be accomplished in various ways discussed herein, for example.

During a sink function recognizing step 312, an embodiment identifies one or more sink functions 314, such as functions 126 capable of manipulating strings or memory, for instance. Step 312 may be accomplished in various ways discussed herein, for example. Note that use of "recognizing" in labeling step 312 promotes convenient reference to this step, just as use of "identifying" promotes convenient reference to step 308. The terms serve as labels, in the sense that one could also have used "recognizing" for step 308 and "identifying" for step 312 and obtained an equivalent document.

During a graph constructing step 316, an embodiment constructs at least one architectural graph 214, such as a control flow graph, a data flow graph, or a program dependency graph, for example. Step 316 may assist step 308 and/or step 312 in identifying/recognizing certain functions. Step 316 may also inform weight assigning steps discussed below, by providing information as to the relative location of code changes 208, e.g., whether a change is on a flow between a source function and a sink function. Step 316 may be accomplished using familiar architectural graph construction mechanisms, for example. In particular, data flow analysis may be performed using the Desquirr decompiler plug-in from sourceforge dot net, the BeaEngine disassemble library from beaengine dot org, or the OBJRec plug-in from openrce dot org, for example.

During an export table reading step 318, an embodiment reads an export table 324, as part of identifying 308 source functions, for example. Step 318 may be accomplished using parsers, file systems, and/or other familiar mechanisms, for example.

During an import table reading step 320, an embodiment reads an import table 326, as part of identifying 308 source functions, for example. Step 320 may be accomplished using parsers, file systems, and/or other familiar mechanisms, for example.

During an RPC interface reading step 322, an embodiment reads a remote procedure call (RPC) interface 328, as part of identifying 308 source functions, for example. Step 322 may be accomplished using service calls, queries, and/or other familiar mechanisms, for example.

During a sink function item finding step 330, an embodiment finds an item as part of recognizing 312 sink function(s), for example. Step 330 may be accomplished using parsers, file systems, code analyzers, architectural graphs or other architectural diagrams, and/or other familiar mechanisms, for example. Items found 330 may include a call 332 to a blacklisted function 224, a function 334, 126 targeted by a patch 124, a memory allocation function 336, a memory duplication function 338, a string manipulation function 340, a parameter count mismatch function 342, and/or a parameter size mismatch function 344, for example, each of which is discussed further elsewhere herein.

During a weight assigning step 346, an embodiment assigns weights to code changes 208, to assist production of a list of changes in order of decreasing likely relevance to security vulnerabilities, for example. Weights may be assigned 346 in various ways.

For example, some embodiments assign 346, 348 weights using zero or another predetermined threshold 350. Some changes are assigned a weight above the threshold (e.g., changes on a flow between a sink and a source function) while other changes are assigned a weight below the threshold (e.g., changes 208 not on such a flow).

Some embodiments assign 346, 352 weights additively. A code change that has multiple characteristics 210 indicating likely relevance receives the sum of the respective weights, while other embodiments assign 346 weights non-additively, e.g., by assigning a change 208 the most recent or the greatest of the weights for characteristics 210 exhibited by the change 208.

Some embodiments assign 346, 354 weights favorably. For example, changes 208 to data flow may be favored over changes to control flow for scrutiny by an analyst, or vice versa. Changes in string manipulation functions (concatenation, copy, or both) may be favored over some other changes 208. Changes which add a comparison to a parameter of a memory function (allocation, duplication, or both) may be favored over some other changes 208. String manipulation assembly routine changes may be favored over some other changes 208. A given embodiment may incorporate zero or more of these favorable treatments, as indicated by the weights 212 accorded in the embodiment to particular kinds of changes 208.

During a patch difference location determining step 356, a location of a patch difference (in terms of the patch change 208) is determined with respect to a control flow graph and/or a data flow graph. Step 356 may inform weight assigning step 346, for example, when rule characteristics 210 involve the location of a patch change relative to sink and source function flows. Step 356 may be accomplished using elicited 306 patch differences and constructed 316 architectural graphs, for example.

During a sanitization ascertaining step 402, an embodiment ascertains whether a sanitization check 404 is present to sanitize or otherwise check the validity of input to a function, such as a sink function 314, for example. Step 402 may be accomplished by checking whether the function in question is a known safe function 226, and/or by familiar data flow analysis mechanisms, for example.

During a learning step 406, an embodiment learns (identifies, ascertains, locates, etc.) input source(s) of a patch-targeted function 126, such as a patch-targeted recognized sink function for example. Step 406 may inform a weight assigning 346 step, and may be accomplished using data flow analysis, control flow analysis, and/or other familiar mechanisms, for example.

During a rule-based weight assigning step 346, 408-450, an embodiment assigns a weight based on at least one of the prioritization rules 204 enumerated below. Rule enumeration is for convenient reference, and does not necessarily exclude other prioritization rules 204, including other rules discussed herein. Also, the order of rules 204 in an enumeration is not necessarily the order in which rules would be tested against code changes 208, and is not necessarily an order of decreasing (or increasing) weights 212. The weights Weight-A, Weight-B, and so on that are assigned 346 may be all different, may be some the same and some different, or may be all the same, depending on the embodiment. Consistent with established term construction practices, a singular reference to any item means "one or more" of the items throughout this document except as expressly indicated otherwise, and that construction is highlighted in several places below as a reminder, without limitation to those particular items.

Rule A. If a code change 208 to a sink function 314 replaces a vulnerable (not known to be safe) string concatenation function call with a safe string concatenation function call, then the code change is assigned Weight-A.

Rule B. If a code change to a sink function replaces a vulnerable string copy function call with a safe string copy function call, then the code change is assigned Weight-B.

Rule C. If a code change deletes a string manipulation assembly routine and adds a safe string copy function call, then the code change is assigned Weight-C.

Rule D. If a code change modifies control flow before assembly instructions for a string operation and provides a different parameter value for those instructions, then the code change is assigned Weight-D.

Rule E. If a code change adds a call to a function which checks string length, then the code change is assigned Weight-E.

Rule F. If a code change modifies a function which checks string length, then the code change is assigned Weight-F Rule G. If a code change adds a call to a function which concatenates strings, then the code change is assigned Weight-G.

Rule H. If a code change modifies a function which concatenates strings, then the code change is assigned Weight-H.

Rule I. If a code change adds a call to a function which copies strings, then the code change is assigned Weight-I.

Rule J. If a code change modifies a function which copies strings, then the code change is assigned Weight-J.

Rule K. If a code change adds an assembly instruction 130 which manipulates strings, then the code change is assigned Weight-K. "An assembly instruction" means one or more assembly instructions.

Rule L. If a code change deletes an assembly instruction which manipulates strings, then the code change is assigned Weight-L.

Rule M. If a code change to a function adds a comparison instruction to a parameter of an assembly instruction which manipulates strings, then the code change is assigned Weight-M. "A comparison instruction" means one or more comparison instructions.

Rule N. If a code change to a function adds a comparison instruction to a parameter of a memory allocation function then the code change is assigned Weight-N. "A parameter" means one or more parameters.

Rule O. If a code change to a function adds a comparison instruction to a parameter of a memory duplication function then the code change is assigned Weight-O.

Rule P. If a code change modifies control flow before assembly instructions for a memory operation and provides a different parameter value for those instructions, then the code change is assigned Weight-P.

Rule Q. If a code change modifies a function, and a data flow architectural graph connection is found from a remote procedure call interface to the modified function, then the code change is assigned Weight-Q. A "connection" means one or more connections.

Rule R. If a code change modifies a function, and a data flow architectural graph connection is found from an export table to the modified function, then the code change is assigned Weight-R.

Rule S. If a code change modifies a function, and a control flow architectural graph connection is found from a remote procedure call interface to the modified function, then the code change is assigned Weight-S.

Rule T. If a code change modifies a function, and a control flow architectural graph connection is found from an export table to the modified function, then the code change is assigned Weight-T.

Rule U. If a code change modifies a function, and a program dependency architectural graph connection is found from a remote procedure call interface to the modified function, then the code change is assigned Weight-U.

Rule V. If a code change modifies a function, and a program dependency architectural graph connection is found from an export table to the modified function, then the code change is assigned Weight-V.

Rule W. If a code change modifies at least one parameter of a vulnerable assembly routine, then the code change is assigned weight-W.

During a list outputting step 452, an embodiment outputs a list 228 of code changes 208 (or equivalently, patch differences 304) ranked according to likely relevance to security vulnerabilities, based on the weights assigned 346 to prioritize the changes. The entire list may be output together, or the embodiment may provide the list in sections, or even one list entry at a time, depending on the embodiment and user commands received by the embodiment. Step 452 may be accomplished using linked lists, trees, and/or other internal representations of the changes, which are then sorted by weight assigned and sent (possibly in the form of corresponding natural language text) to a peripheral device.

The foregoing steps and their interrelationships are discussed in greater detail below, in connection with various embodiments.

Some embodiments provide a process for binary code patch change vulnerability prioritization. The process includes obtaining 302 a collection of patch differences representing changes to a precursor binary code, identifying 308 at least one source function of the precursor binary code, recognizing 312 at least one sink function of the precursor binary code, assigning 346 weights to respective patch differences (each weighted patch difference being located between some identified source function and some recognized sink function), and outputting 452 a list of patch differences ranked by weight.

Different embodiments may use different ways to obtain 302 patch differences. Sometimes previously elicited differences will be prioritized using different rules, for example, in which case the differences may be obtained by reading a file containing them. Initially, the differences may be obtained by eliciting 306 them, e.g., from a diff of the unpatched binary and the patched binary, a comparison of the unpatched binary to the patch, or even the patch alone. In some embodiments, the step of obtaining patch differences includes at least one of the following: eliciting 306 patch differences from a byte-wise comparison of the precursor binary code with a patched binary code, eliciting 306 patch differences from a byte-wise comparison of the precursor binary code with a patch, eliciting 306 patch differences from a patch.

Different embodiments may use different ways to identify 308 source functions 310. In some embodiments, the step of identifying at least one source function includes at least one of the following: reading 318 an export table and then identifying as a source function a function specified in the export table, reading 320 an import table and then identifying as a source function a function specified in the import table, reading 322 a remote procedure call interface and then identifying as a source function a function specified in the remote procedure call interface identifying 308 as a source function a function specified as taking input from a file.

Different embodiments may use different ways to recognize 312 sink functions 314. Some of the ways to find sink functions include (a) use a blacklist, (b) consider any patched function a sink function, (c) treat malloc, memcpy etc. as sink functions, (d) treat strcat, strcpy etc. as sink functions, (e) look for a mismatch in number of parameters expected versus parameters supplied, (f) look for a mismatch in size of parameter expected versus parameter supplied.

In some embodiments, the step of recognizing at least one sink function includes at least one of the following: finding 330 a call 332 to a blacklisted function 224 and then recognizing as a sink function the called blacklisted function, finding 330 a function 334 targeted by a patch difference and then recognizing as a sink function the targeted function, finding 330 a memory allocation function 336 (e.g., malloc, calloc, etc.) and then recognizing as a sink function the memory allocation function, finding 330 a memory duplication function 338 (e.g., memcpy) and then recognizing as a sink function the memory duplication function, finding 330 a string manipulation function 340 (e.g., strcat, strcpy) and then recognizing as a sink function the string manipulation function, finding 330 a string manipulation assembly routine 340 (e.g., to concatenate or copy strings) and then recognizing as a sink function the string manipulation assembly routine, finding 330 a parameter count mismatch function 342 (a function having a mismatch between number of parameters expected and number of parameters supplied) and then recognizing as a sink function the parameter count mismatch function, finding 330 a parameter size mismatch function 344 (a function having a mismatch between maximum expected size of a parameter and actual size of a supplied parameter) and then recognizing as a sink function the parameter size mismatch function.

Some embodiments give more weight to changes on control flow and/or data flow between source and sink functions. Some embodiments determine 356 that a patch difference is located on a control flow 216 between an identified source function and a recognized sink function, and then assign 346 a weight to the patch difference to increase the ranking of the patch difference. Some embodiments determine 356 that a patch difference is located on a data flow 218 between an identified source function and a recognized sink function, and then assign 346 a weight to the patch difference to increase the ranking of the patch difference In some embodiments, any code changes which are not in the data flow and control flow path between the source and the sink functions are assigned negative weights for a lower ranking. More generally, the assigning step in some embodiments assigns 348 weights 212 using a threshold by assigning a weight above a predetermined weight threshold to patch differences located between source functions and sink functions, and assigning a weight below the predetermined weight threshold to a patch difference that is located off the control flows between identified source functions and recognized sink functions.

Weights can be additive, at least in some embodiments. If a code change satisfies two of the rules 204 (a.k.a. heuristics) then the change gets credit for both of them. In some embodiments weights 212 are assigned 352 additively. Thus, a code change which is assigned a first weight based on a first criterion and is also assigned a second weight based on a second criterion is thereby assigned at least the sum of the first weight and the second weight.

In some embodiments, some heuristics are more important than other heuristics. In some embodiments, weights are assigned 354 favoring data flow changes, in that a data flow change 208 receives more weight than a control flow change. A greater weight is assigned to a patch difference located on a data flow between some identified source function and some recognized sink function than a lesser weight which is assigned to a patch difference located on a control flow between some identified source function and some recognized sink function.

In some embodiments, weights are assigned 354 favoring string concatenation changes. A string concatenation function change 208 receives more weight 212 than another change which does not change any string concatenation function. In some, weights are assigned 354 favoring string concatenation changes, in that a safe string concatenation function change receives more weight than another change which does not involve a safe string concatenation function.

In some embodiments, weights are assigned 354 favoring string copy changes. A string copy function change 208 receives more weight than another change which does not change any string copy function. In some, weights are assigned 354 favoring string copy changes, in that a safe string copy function change receives more weight than another change which does not involve a safe string copy function.

In some embodiments, weights are assigned 354 favoring memory allocation parameter comparison changes. A change 208 which introduces a comparison instruction in a parameter of a memory allocation function receives more weight 212 than another change which does not introduce a comparison instruction in a parameter of a memory allocation function.

In some embodiments, weights 212 are assigned 354 favoring memory copy parameter comparison changes. A change 208 which introduces a comparison instruction in a parameter of a memory copy function receives more weight than another change which does not introduce a comparison instruction in a parameter of a memory copy function.

In some embodiments, weights 212 are assigned 354 favoring string manipulation assembly routine changes. A change 208 which replaces a string manipulation assembly routine with a call to a string copy function receives more weight than another change which does not replace a string manipulation assembly routine with a call to a string copy function. In some embodiments, weights are assigned 354 favoring string manipulation assembly routine changes, in that a change 208 which replaces a string manipulation assembly routine with a call to a safe string copy function receives more weight than another change which does not replace a string manipulation assembly routine with a call to a safe string copy function.

Some embodiments construct 316 an architectural graph connecting sink functions and source functions, and assign 346 weights 212 to respective patch differences based on architectural graph(s) 214 and on a set of rules 204 which specify particular kinds of patch differences. Some embodiments use one or more of rules 204 enumerated herein.

Some embodiments identify 308 as a source function 310 a function specified in an export table 324, a function specified in an import table 326, and/or a function specified in a remote procedure call interface 328.

Some embodiments recognize 312 as a sink function 314 a string copy function, a string concatenation function, a memory allocation function, a memory duplication function, a string manipulation assembly routine, and/or a function which was changed (or will be changed) by application of a patch. Some also ascertain 402 whether a sanitization check is present to check input to a sink function.

Some embodiments proceed as follows. Identify 308 the functions which accept input from a network 108. Recognize 312 the vulnerable functions 222, 314 which can be exploited. Construct 316 a call graph 214 between the source and the sink functions. Obtain 302 the address of the code change(s) 208 which is/are patching the vulnerability. Assign 346 weight(s) to the code changes. If the code changes are in the data flow graph, then assign Weight-1. If the code changes are in the control flow graph from source to sink function, then assign Weight-2. If the code changes are close to the vulnerable sink functions, then assign Weight-3. If the code changes contain certain assembly instructions (e.g., as set forth in enumerated Rules above), then assign Weight-4. If the code changes alter/introduce strcpy, then assign Weight-5. These weights are in decreasing order in some embodiments, and equal in some embodiments, and vary in some embodiments. Continue until all code changes have been assigned a weight 212. Then sort the code changes in descending order by weight. The code change with the highest weight gets the highest priority.

Some embodiments proceed as follows. Recognize 312 candidate sink functions which can be exploited. Ascertain 402 whether there is any sanitization check 404 on the input of the vulnerable sink functions. If not, learn 406 whether the changed function takes input from a function in the import table, export table, or RPC interface. If not, stop. If step 406 is answered yes, or if step 402 is answered no, then assign 346 weight to changes using the rules 204.

Some embodiments proceed as follows. Identify 308 source functions from the import table, export table, and RPC interface. Recognize 312 sink functions which are blacklisted functions 224, namely, strcpy, strcat, calloc, malloc, alloc, or the like. Using the rules 204, assign 346 weights to the changes located between the sources and sinks. Rules 204 may be viewed as including sanitization checks 404 on the output of functions. The function with the highest weight gets the highest priority for scrutiny by an analyst.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as a change prioritizer 202, prioritization rules 204, a prioritization engine 206, and an outputted 452 list 228 of ranked changes 208 (or equivalently, ranked changed functions 334), in the form of data 118 and instructions 116, read from a removable medium 114 and/or another source such as a network connection, to form a configured medium. The configured medium 112 is capable of causing a computer system to perform process steps for transforming data through patch change prioritization as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

By way of introduction, tainted data is derived from untrusted input sources like network messages, input files, or command line options. In some embodiments, all the external input is considered tainted. Some of the source functions which could introduce taint are read, fread and recv. These functions which introduce the tainted data are called source functions. A process of ranking the changed functions is explained in the following steps.

Step 1: Identify 308 the source functions in a binary file. Source functions can be the functions in the export table, import table and/or the function from the RPC interface. Source functions are the functions which provide input, which is used to exploit the vulnerable sink function(s).

Step 2: Sink functions are recognized 312, namely, the functions which are vulnerable points and can be exploited. Sink functions can be recognized various ways. One way is to use deterministic bug finding algorithms. To detect format string vulnerability, a count of formal arguments specified and the number of actual arguments to a function is made. For each class of function count a format specifier and the number of arguments is pre-determined. If there is a mismatch in the count of format specifier and the parameters to a function, then the function is marked as prone to format string vulnerability. For determining buffer overflow vulnerability, calculate the size of source and the destination buffer. If the data copied in the destination is more than it can hold, an alert is generated for buffer overflow attacks.

Sink functions can also be recognized by checking for calls to blacklisted functions 224 like strcpy, strcat. Sink functions can also be recognized by searching for functions like calloc, malloc, memcpy, alloc, and string manipulation assembly routines, which if not properly used are prone to exploitation. All the changed functions after applying the patch can also be treated as patched sink functions (changed functions 334).

Step 3: After source and sink functions have been identified in a binary, a call graph 214 is constructed 316 from sink functions to source functions. The call graph C is a directed graph C=(N, E) that represents calling relationships (control flow and data flow) between functions in a program. Each node ni in N represents a function/subroutine and each edge (ni, nj) in E indicates that function ni calls function nj. Tainted data are introduced by the source function (e.g. fread, recv) and flow into vulnerable sink functions.

Step 4: If there exists a program dependency graph between the vulnerable functions determined by bug finding algorithms and export table/RPC interface, then these functions are given more weight and thus higher priority for investigation by an analyst.

Step 5: After constructing the call graph between the source function and the sink function, assign 346 the weights to the code changes. Assignment of weights are done with (but not necessarily limited to) the following rules 204. As with the earlier rule enumeration, rules are not necessarily listed in order of decreasing weight, or in order of testing characteristics 210, and weights 212 noted in the rules may be identical or different from one another, depending on the embodiment. Weights 212 may be tailored by users 104 to emphasize or de-emphasize particular characteristics 210, in some embodiments.

Rule AA. If in a changed function (patched sink function), there is replacement of vulnerable string concatenation and/or copy function calls with safe string concatenation/copy function calls then the code changes are assigned weight W1.

Some of the many possible examples include: "ds:_imp_strcpy_lstrcpy" being replaced by "_StringCbCopy", "_wscpy" is deleted and the function "call_StringCopyWorkerW" is added, deletion of call "wsprintfw" and addition of the function "StringCChPrintf", the function "call ebx_imp_wscpy" is replaced with "StringCopyWorker", "Call ds:_imp_Wcsncat" is replaced with the function "StringCatWorker", deletion of the functions "WcScpy" and "Wcscat" and addition of the call "StringCchPrintf", and function call strcpy has been deleted and the call to StringCopyWorker has been added.

Rule BB. If the changes in a function add comparison instructions to the parameters of calloc, malloc, alloc, Globalalloc, memcpy (memory allocation, memory copy) functions then the code change is assigned weight W2. Some of the many possible examples include conditional check for the arguments of Globalalloc function, insertion of comparison unsigned instructions before _RtlMoveMemory, conditional check for the arguments of Weballoc function, comparison instructions before inline memory copy "rep movsd", comparison instruction to check the parameters passed to the inline "rep movsd". Control flow may be changed.

Rule CC. If there is change in control flow before the assembly instructions for string operations and the change in control flow provides different values to the parameter of assembly instruction(s) for string operations (and/or calloc, malloc, alloc, memcpy) then the changed function is assigned weight W3. Some examples include addition of a jmp instruction before an inline memcpy "rep movsd", and a comparison instruction for the parameters of _imp_GlobalAlloc function; the patch adds the check for the assembly instructions like "lea, cmp and jle" instructions.

Rule DD. If there is addition/modification of a function call which checks string length like "wcslen" then the changed function gets weight W4.

Rule EE. If there is addition/deletion of string manipulation function calls like strcat, strcpy then the changes are given higher priority than other changed functions. These changes get weight W5.

Rule FF. If in the changed assembly routines, there is deletion/addition of function calls which check for length (e.g., "wslen", ds_imp_wcslen) along with addition of condition checks then the changed function gets weight W6.

Rule GG. If in a changed assembly function, there is deletion/addition of assembly instruction(s) for string manipulation like "rep movsb" from unpatched functions, then the changed function gets weight W7. One example involves vulnerable function _pbmiConvertFile. The patch introduces the change in control flow by which two values of the register "ebx" can be passed to the string operations "rep movsd". The value of register "ebx" gets loaded in "esi" by the instruction "mov esi,ebx". This is just before a "rep movsd" assembly instruction.

Rule HH. For network based vulnerabilities, if there exists a data flow graph from the RPC interface/export table to the changed function, then since the changed function can get its input from network, the changed function gets weight W8.

Rule II. For network based vulnerabilities, if there exists a control flow graph from the RPC interface/export table to the changed function, then the change gets weight W9.

Rule JJ. For network based vulnerabilities, if there exists a program dependency graph from the RPC interface/export table to the changed function, then since the changed function can get its input from network, it gets weight W10. For example, a vulnerability may be due to non-null terminated strings which can cause a string operation to go out of bounds, e.g., when two strings are concatenated with no check performed on the data.

Rule KK. If the patches or the changed assembly instructions introduce comparison instruction(s) to the parameter of the string manipulation assembly instructions, then the changed function get higher priority compared to other changed functions. These changes are assigned weight W11.

Rule LL. If there is deletion of string manipulation assembly routines like "rep movsb" and addition of the safe string copy functions like StringCbCopy function, then the changes are assigned weight W12.

Step 6: The code changes which have the greatest weight are given the highest priority and are first analyzed by the analyst.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment.

Rather, the specific features and acts described are disclosed as examples for consideration when implementing the claims.

All changes which come within the meaning and range of equivalency of the claims are to be embraced within their scope to the full extent permitted by law.

What is claimed is:

1. A process for binary code patch change vulnerability prioritization, the process comprising the steps of automatically:
   obtaining a collection of patch differences representing changes to a precursor binary code;
   identifying source functions of the precursor binary code, each source function specified in an export table, an import table, or a remote procedure call interface;
   recognizing sink functions of the precursor binary code, each sink function specified in a blacklist, or capable of manipulating strings or memory;
   constructing an architectural graph connecting sink functions and source functions; and
   assigning weights to respective patch differences, based on the architectural graph and on a set of rules which specify particular kinds of patch differences.

2. The process of claim 1, wherein the step of identifying source functions comprises at least one of the following:
   identifying as a source function a function specified in an export table;
   identifying as a source function a function specified in an import table;
   identifying as a source function a function specified in a remote procedure call interface;
   identifying as a source function a function specified as taking input from a file.

3. The process of claim 1, wherein the step of recognizing sink functions comprises at least one of the following:
   recognizing as a sink function a string copy function;
   recognizing as a sink function a string concatenation function;
   recognizing as a sink function a memory allocation function;
   recognizing as a sink function a memory duplication function;
   recognizing as a sink function a string manipulation assembly routine;
   recognizing as a sink function a function which was changed by application of a patch.

4. The process of claim 1, wherein the assigning step assigns at least one code change weight additively, namely, a code change which is assigned a first weight based on a first rule and is also assigned a second weight based on a second rule is eventually assigned a weight which is at least as great as the sum of the first weight and the second weight.

5. The process of claim 1, wherein the assigning step assigns weights above a predetermined threshold to changes located in the architectural graph based on at least one of the following rules:
   if a code change to a sink function replaces a vulnerable string concatenation function call with a safe string concatenation function call, then the code change is assigned such a weight;
   if a code change to a sink function replaces a vulnerable string copy function call with a safe string copy function call, then the code change is assigned such a weight;
   if a code change adds a call to a function which checks string length, then the code change is assigned such a weight;
   if a code change modifies a function which checks string length, then the code change is assigned such a weight;
   if a code change adds a call to a function which concatenates strings, then the code change is assigned such a weight;
   if a code change modifies a function which concatenates strings, then the code change is assigned such a weight;
   if a code change adds a call to a function which copies strings, then the code change is assigned such a weight;
   if a code change modifies a function which copies strings, then the code change is assigned such a weight.

6. The process of claim 1, wherein the assigning step assigns weights above a predetermined threshold to changes located in the architectural graph based on at least one of the following rules:
   if a code change to a function adds a comparison instruction to a parameter of a memory allocation function then the code change is assigned such a weight;
   if a code change to a function adds a comparison instruction to a parameter of a memory duplication function then the code change is assigned such a weight;
   if a code change modifies control flow before assembly instructions for a memory operation and provides a different parameter value for those instructions, then the code change is assigned such a weight.

7. The process of claim 1, wherein the assigning step assigns weights above a predetermined threshold to changes located in the architectural graph based on at least one of the following rules:
   if a code change modifies a function, and a data flow architectural graph connection is found from a remote procedure call interface to the modified function, then the code change is assigned such a weight;
   if a code change modifies a function, and a data flow architectural graph connection is found from an export table to the modified function, then the code change is assigned such a weight;
   if a code change modifies a function, and a control flow architectural graph connection is found from a remote procedure call interface to the modified function, then the code change is assigned such a weight;
   if a code change modifies a function, and a control flow architectural graph connection is found from an export table to the modified function, then the code change is assigned such a weight.

8. The process of claim 1, further comprising ascertaining whether a sanitization check is present to check input to a sink function.

9. The process of claim 1, wherein the assigning step assigns weights above a predetermined threshold to changes located in the architectural graph based on at least one of the following rules:
   if a code change deletes a string manipulation assembly routine and adds a safe string copy function call, then the code change is assigned such a weight;
   if a code change modifies control flow before assembly instructions for a string operation and provides a different parameter value for those instructions, then the code change is assigned such a weight;
   if a code change adds an assembly instruction which manipulates strings, then the code change is assigned such a weight;
   if a code change deletes an assembly instruction which manipulates strings, then the code change is assigned such a weight;
   if a code change to a function adds a comparison instruction to a parameter of an assembly instruction which manipulates strings, then the code change is assigned such a weight;

if a code change modifies at least one parameter of a vulnerable assembly routine, then the code change is assigned such a weight.

10. The process of claim 1, wherein the assigning step assigns weights above a predetermined threshold to changes located in the architectural graph based on at least the following rule:

if a code change modifies at least one parameter of a vulnerable assembly routine, then the code change is assigned such a weight.

11. The process of claim 1, wherein the assigning step assigns weights above a predetermined threshold to changes located in the architectural graph based on at least one of the following rules:

if a code change modifies a function, and a program dependency architectural graph connection is found from a remote procedure call interface to the modified function, then the code change is assigned such a weight;

if a code change modifies a function, and a program dependency architectural graph connection is found from an export table to the modified function, then the code change is assigned such a weight.

12. A computer-readable storage memory configured with data and with instructions that when executed by at least one processor causes the processor(s) to perform a process for binary code patch change vulnerability prioritization, the process comprising the steps of:

obtaining a collection of patch differences representing changes to a precursor binary code;

identifying at least one source function of the precursor binary code;

recognizing at least one sink function of the precursor binary code;

assigning weights to respective patch differences, each weighted patch difference being located between some identified source function and some recognized sink function, the source function specified in an export table, an import table, or a remote procedure call interface and the sink function specified in a blacklist, or capable of manipulating strings or memory; and outputting a list of patch differences ranked by weight.

13. The configured memory of claim 12, wherein the step of obtaining patch differences comprises at least one of the following:

eliciting patch differences from a byte-wise comparison of the precursor binary code with a patched binary code;

eliciting patch differences from a byte-wise comparison of the precursor binary code with a patch;

eliciting patch differences from a patch.

14. The configured memory of claim 12, wherein the step of identifying at least one source function comprises at least one of the following:

reading an export table and then identifying as a source function a function specified in the export table;

reading an import table and then identifying as a source function a function specified in the import table;

reading a remote procedure call interface and then identifying as a source function a function specified in the remote procedure call interface.

15. The configured memory of claim 12, wherein the step of recognizing at least one sink function comprises at least one of the following:

finding a memory allocation function and then recognizing as a sink function the memory allocation function;

finding a memory duplication function and then recognizing as a sink function the memory duplication function;

finding a string manipulation function and then recognizing as a sink function the string manipulation function;

finding a string manipulation assembly routine and then recognizing as a sink function the string manipulation assembly routine;

finding a parameter count mismatch function, namely, a function having a mismatch between number of parameters expected and number of parameters supplied, and then recognizing as a sink function the parameter count mismatch function;

finding a parameter size mismatch function, namely, a function having a mismatch between maximum expected size of a parameter and actual size of a supplied parameter, and then recognizing as a sink function the parameter size mismatch function.

16. The configured memory of claim 12, wherein the process comprises determining a patch difference location by doing at least one of the following:

determining that a patch difference is located on a control flow between an identified source function and a recognized sink function, and then assigning a weight to the patch difference during the assigning step;

determining that a patch difference is located on a data flow between an identified source function and a recognized sink function, and then assigning a weight to the patch difference during the assigning step.

17. The configured memory of claim 12, wherein the assigning step assigns weights using a threshold by assigning a weight above a predetermined weight threshold to patch differences located between source functions and sink functions, and assigning a weight below the predetermined weight threshold to a patch difference that is located off the control flows between identified source functions and recognized sink functions.

18. The configured memory of claim 12, wherein the assigning step assigns weights consistent with at least one of the following conditions:

weights are assigned favoring string concatenation changes, in that a safe string concatenation function change receives more weight than another change which does not involve a safe string concatenation function;

weights are assigned favoring string copy changes, in that a safe string copy function change receives more weight than another change which does not involve a safe string copy function;

weights are assigned favoring memory allocation parameter comparison changes, in that a change which introduces a comparison instruction in a parameter of a memory allocation function receives more weight than another change which does not introduce a comparison instruction in a parameter of a memory allocation function;

weights are assigned favoring memory copy parameter comparison changes, in that a change which introduces a comparison instruction in a parameter of a memory copy function receives more weight than another change which does not introduce a comparison instruction in a parameter of a memory copy function;

weights are assigned favoring string manipulation assembly routine changes, in that a change which replaces a string manipulation assembly routine with a call to a safe string copy function receives more weight than another change which does not replace a string manipulation assembly routine with a call to a safe string copy function.

19. The configured medium of claim 12, wherein the step of recognizing at least one sink function comprises at least one of the following:
- finding a call to a blacklisted function and then recognizing as a sink function the called blacklisted function;
- finding a function targeted by a patch difference and then recognizing as a sink function the targeted function.

20. The configured medium of claim 12, wherein the assigning step assigns weights consistent with at least one of the following conditions:
- weights are assigned additively, namely, a code change which is assigned a first weight based on a first criterion and is also assigned a second weight based on a second criterion is thereby assigned at least the sum of the first weight and the second weight;
- weights are assigned favoring data flow changes, in that a data flow change receives more weight than a control flow change, namely, a greater weight is assigned to a patch difference located on a data flow between some identified source function and some recognized sink function than a lesser weight which is assigned to a patch difference located on a control flow between some identified source function and some recognized sink function.

* * * * *